United States Patent
Chen et al.

(10) Patent No.: US 6,677,740 B1
(45) Date of Patent: Jan. 13, 2004

(54) APPLIED CONTROL SYSTEM OF THE POWER PERIPHERY OF A HEALTH APPARATUS HAVING FUNCTION OF POWER GENERATION

(75) Inventors: Tien-Chi Chen, Tainan (TW); Mi-Ching Tsai, Tainan (TW); Tsai-Jiun Ren, Tainan (TW); Andy Wu, Tainan Hsien (TW); Joseph Wu, Tainan Hsien (TW)

(73) Assignee: Tonic Fitness Technology, Inc., Tainan Hsien (TW)

( * ) Notice: Subject to any disclaimer, the term of this patent is extended or adjusted under 35 U.S.C. 154(b) by 0 days.

(21) Appl. No.: 10/252,515

(22) Filed: Sep. 24, 2002

(51) Int. Cl.[7] ................................. G05F 5/00
(52) U.S. Cl. ..................................... 323/303
(58) Field of Search ................. 323/267–269, 323/273, 275, 279, 299, 303, 911

(56) References Cited

U.S. PATENT DOCUMENTS

| | | | | |
|---|---|---|---|---|
| 5,370,645 A | * | 12/1994 | Klicek et al. | 606/35 |
| 6,389,315 B1 | * | 5/2002 | Schu et al. | 607/16 |
| 6,427,129 B1 | * | 7/2002 | Lalla | 702/88 |
| 6,611,553 B1 | * | 8/2003 | Scott et al. | 375/220 |

* cited by examiner

Primary Examiner—Matthew V. Nguyen
(74) Attorney, Agent, or Firm—Bacon & Thomas PLLC

(57) ABSTRACT

An applied control system of the power periphery of a health apparatus having function of power generation is connected with a health apparatus able to generate electricity and a peripheral device unit. The applied control system includes a voltage-controlling oscillator, an analog digital converter and an intellectual control system. The peripheral device unit includes several peripheral devices arranged in sequence. DC generated by the health apparatus is transmitted to the voltage control oscillator, which modulates the DC to a proper frequency. The analog digital converter, detects the electric power that the voltage controlled oscillator can output, transmits the detected data to the intellectual control system and controls the intellectual control system to decide the number of the peripheral devices to be started according to the electric power, the sequence and the power consumption of the peripheral devices, able to utilize electric power completely.

3 Claims, 2 Drawing Sheets

APPLIED CONTROL SYSTEM OF THE POWER PERIPHERY OF A HEALTH APPARATUS HAVING FUNCTION OF POWER GENERATION

BACKGROUND OF THE INVENTION

This invention relates to an applied control system of the power periphery of a health apparatus having function of power generation, particularly to one able to efficiently distribute the electric power generated by a health apparatus to peripheral devices according to the electric power they need, possible to utilize all the electric power completely.

Conventional health apparatus are divided into two categories: ones unable to generate electricity and the other able to generate electricity. The former is a common health apparatus while the latter is generally called "a permanent-magnet health apparatus" which in operation can convert kinetic energy into electric power for one or more peripheral devices (such as an electric fan, a radio or the like) to use.

However, when the conventional health apparatus having function of power generation is in operation, only a little of the electric power generated by its generator is utilized and the remaining electric power is consumed by resistances in the apparatus which may gradually be heated and heighten the temperature of the health apparatus. Thus, high temperature of resistances may cause damage to some elements of the health apparatus, thus shortening its service life and possible to give rise to scald in case a user touches the place around the resistances by accident. Some conventional health apparatus having function of power generation is able to distribute its electricity to all the peripheral devices for use, but the result is that the voltage may be too low to start all the peripheral devices at the same time after the electricity is distributed evenly.

SUMMARY OF THE INVENTION

The objective of the invention is to offer an applied control system of the power periphery of a health apparatus having function of power generation, able to distribute properly the electricity generated by the health apparatus to its peripheral devices in accordance with the electricity they need, having effect of utilizing all the electricity completely.

The applied control system of the power periphery of a health apparatus having function of power generation in this invention is connected outward with a health apparatus having function of power generation and a peripheral device unit. The applied control system consists of a voltage control oscillator (VCO), an analog digital converter (ADC) and an intellectual control system, and the peripheral device unit is composed of several peripheral devices arranged in sequence. Thus, DC generated by the health apparatus is transmitted to the voltage-controlling oscillator, which modulates the electricity to a proper frequency. The analog digital converter, after detecting the electric power that the voltage controlled oscillator can output, will transmit the detected data to the intellectual control system and control the intellectual control system to decide the number of the peripheral devices to be started according to the electric power, the sequence and the power consumption of the peripheral devices, having effects of distributing electricity adequately and utilizing all the electricity completely.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
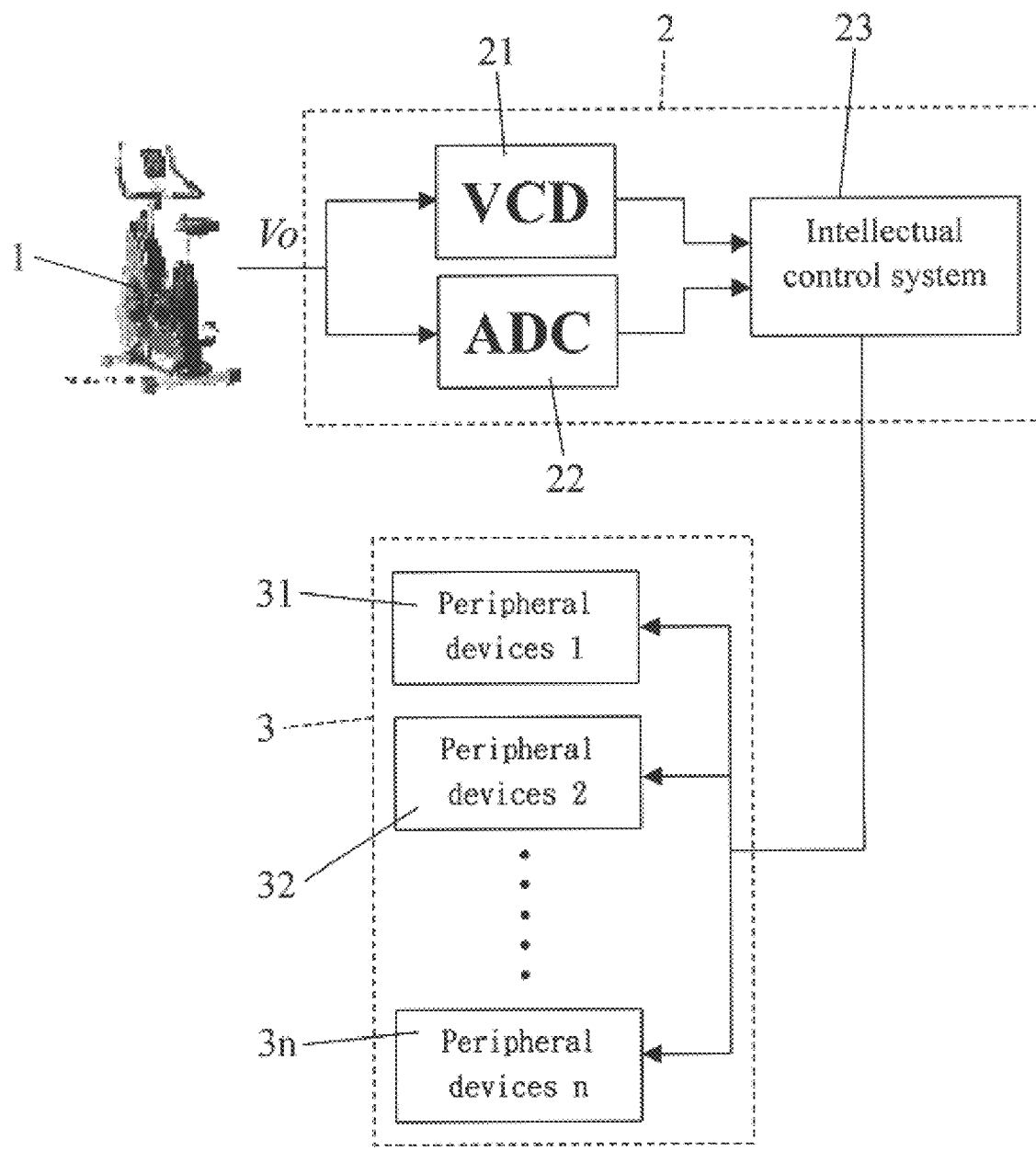
FIG. 1 is a block diagram of an applied control system in the present invention.

A preferred embodiment of an applied control system 2 of the power periphery of a health apparatus having function of power generation in the present invention, as shown in FIG. 1, is connected outward with a health apparatus 1 and a peripheral device unit 3.

The health apparatus 1 connected outward with the applied control system 2 and the peripheral device unit 3 is able to generate electricity when it is operated.

The peripheral device unit 3 consists of several peripheral devices 31, 32, . . . and 3n arranged in sequence according to their importance in use, and the electric power that the peripheral devices 31, 32, . . . and 3n need is in advance input in an intellectual control system 23 of the applied control system 2.

The applied control system 2 consists of a voltage-controlling oscillator (VCO) 21, an analog digital converter (ADC) 22 and an intellectual control system 23. The voltage-controlling oscillator 21 is able to modulate DC generated by the health apparatus 1 to a proper frequency (60 Hz). The analog digital converter 22 is able to convert analog signals into digital signals. The intellectual control system 23 is connected with the voltage-controlling oscillator 21, the analog digital converter 22 and the peripheral device unit 23 in parallel.

Thus, the electric current generated by the health apparatus is converted into DC, which is then transmitted to the voltage-controlling oscillator 21 to be modulated to a frequency of 60 Hz. Simultaneously, the analog digital converter 22, after detecting the electric power that the voltage controlled oscillator 21 can output, transmits the detected data to the intellectual control system 23 and controls the intellectual control system 23 to decide the number of the peripheral devices 31, 32, . . . and 3n to be started in accordance with the electric power, the sequence and power consumption of the peripheral devices. In other words, the larger power the health apparatus 1 generates, the more peripheral devices 31, 32, . . . and 3n can be started and vice versa so as to let all the electricity distributed adequately and utilized completely.

Figure 2:
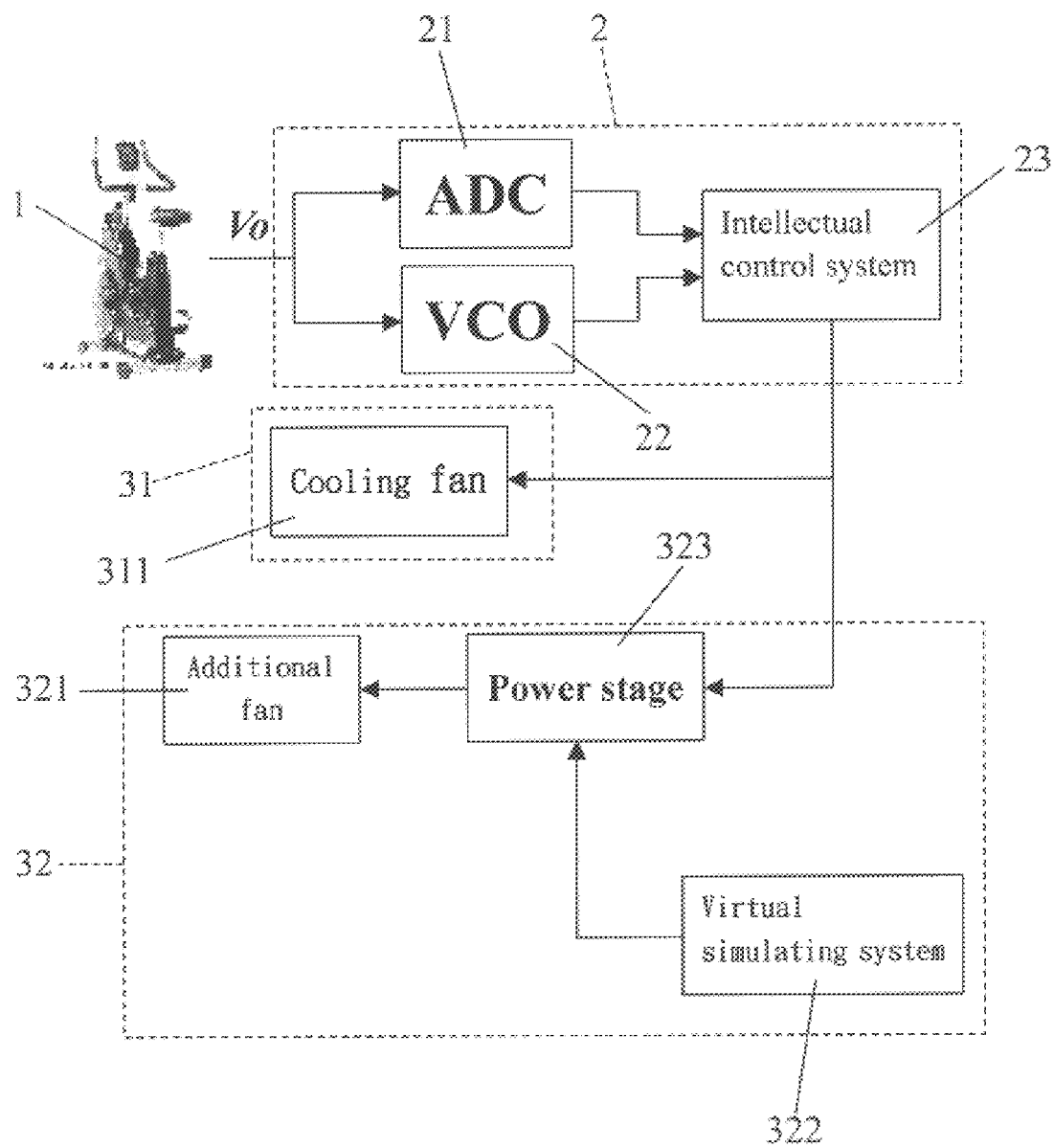
FIG. 2 is a block diagram of the applied control system applied to a cooling fan in the present invention.

The following example shows how the electricity generated by the health apparatus is distributed and applied to a cooling fan 311. The cooling fan 311, as shown in FIG. 2, is provided herein to cool off the resistances (not shown) provided within the health apparatus 1 when the temperature of the resistances grows high, so as to prolong the service life of the health apparatus 1. The cooling force of the cooling fan 311 in cooling off the resistances is decided according to the electric power generated by the health apparatus 1. Besides, an additional fan 321 can also be provided for the user of the health apparatus 1. The additional fan 321 can be connected with a virtual simulating system 322 and a power stage 323 to produce a whiff of relative wind (like open-air breeze or seashore blast) blowing toward the user from outside and able to change according to the situation.

In addition, since all the peripheral devices 31, 32, . . . and 3n (such as a radio, a CD player and the like) are controlled by the electricity generated by the health apparatus 1, therefore under the condition of utilizing electricity effectively, they can be respectively provided with an embedded system to which the intellectual control system 23 gives a turn-on or turn-off signal to start or stop operation of the peripheral devices 31, 32, . . . and 3*n* according to the electricity they need, as shown in FIG. 1, able to reduce waste of electricity and utilize all the electricity completely.

While the preferred embodiment of the invention has been described above, it will be recognized and understood that various modifications may be made therein and the appended claims are intended to cover all such modifications that may fall within the spirit and scope of the invention.

We claim:

1. An applied control system of the power periphery of a health apparatus having function of power generation connected outward with a health apparatus having function of power generation and a peripheral device unit, said applied control system comprising a voltage controlled oscillator (VCO), an analog digital converter (ADC) and an intellectual control system, said peripheral device unit consisting of several peripheral devices arranged in sequence, DC generated by said health apparatus transmitted to said voltage controlled oscillator, said voltage controlled oscillator modulating said DC to a proper frequency, said analog digital converter detecting the electric power that said voltage controlled oscillator can output, said analog digital converter transmitting detected data to said intellectual control system, said analog digital converter controlling said intellectual control system to decide the number of said peripheral devices to be started according to said electric power, the sequence and power consumption of said peripheral devices, said applied control system able to achieve effects of distributing electricity adequately and utilizing it completely.

2. The applied control system of the power periphery of a health apparatus having function of power generation as claimed in claim 1, wherein said peripheral devices are provided therein with a fan connected with a virtual simulating system and a power stage.

3. The applied control system of the power periphery of a health apparatus having function of power generation as claimed in claim 1, wherein said intellectual control system is connected with embedded systems, so that it can give turn-on or turn-off signals to the embedded systems to start or stop operation of said peripheral devices according to the electric power that said peripheral device needs.

* * * * *